(12) United States Patent
El-Mahdy et al.

(10) Patent No.: US 10,013,746 B2
(45) Date of Patent: Jul. 3, 2018

(54) HIGH DYNAMIC RANGE VIDEO TONE MAPPING

(75) Inventors: Ahmed Hazem El-Mahdy, Alexandria (EG); Hisham Emad Elshishiny, Cairo (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1108 days.

(21) Appl. No.: 13/312,786

(22) Filed: Dec. 6, 2011

(65) Prior Publication Data

US 2012/0147953 A1 Jun. 14, 2012

(30) Foreign Application Priority Data

Dec. 10, 2010 (EP) .................................... 10194489

(51) Int. Cl.
*H04N 7/32* (2006.01)
*H04N 7/26* (2006.01)
(Continued)

(52) U.S. Cl.
CPC ............ *G06T 5/009* (2013.01); *H04N 19/44* (2014.11); *H04N 19/61* (2014.11); *H04N 19/85* (2014.11); *G06T 2207/20208* (2013.01)

(58) Field of Classification Search
CPC .. H04N 19/00533; H04N 19/44; H04N 19/61; H04N 19/85; G06T 5/009; G06T 2207/20208
(Continued)

(56) References Cited

U.S. PATENT DOCUMENTS 7,042,944 B2 * 5/2006 van der Schaar et al. 375/240.1
2005/0232355 A1 * 10/2005 Cheedela et al. ........ 375/240.16
(Continued)

FOREIGN PATENT DOCUMENTS

EP 2009921 A2 12/2008
JP 2007-243942 A 9/2007
(Continued)

OTHER PUBLICATIONS

Zhe Wendy Wang et al; "Interactive Tone Mapping for High Dynamic Range Video" Proceedings of IEEE International Conference on Acoustics, Speech, and Signal Processing (ICASSP); Mar. 14, 2010; pp. 1014-1017; Dallas TX.
(Continued)

*Primary Examiner* — Christopher S Kelley
*Assistant Examiner* — Matthew Kwan
(74) *Attorney, Agent, or Firm* — Fabian VanCott; Steven L. Nichols

(57) ABSTRACT

A method for tone-mapping a High Dynamic Range (HDR) data video stream encoded in MPEG format, the method comprising decoding the data video HDR data stream to generate decoded I-frames, auxiliary decoded data related to P-Frames, and auxiliary decoded data related to B-Frames, the method further comprising applying a tone mapping function to each decoded I-Frame to provide a tone-mapped I-Frame according to a tone mapping operator, for each P-frame depending on a reference I-frame, computing the tone-mapped P-frame from the tone-mapped I-Frame previously determined for the reference I-frame, the reference I-Frame, and the auxiliary decoding data related to the P-Frame; and, for each B-frame, computing the tone-mapped B-frame from the tone mapped I-frame previously determined for the reference I-frame, the tone mapped
(Continued)

P-frame previously determined for the reference P-frame, and the auxiliary decoding data related to the B-Frame.

25 Claims, 5 Drawing Sheets

(51) Int. Cl.
*G06T 5/00* (2006.01)
*H04N 19/61* (2014.01)
*H04N 19/44* (2014.01)
*H04N 19/85* (2014.01)

(58) Field of Classification Search
USPC .................................................... 375/240.03
See application file for complete search history.

(56) References Cited

U.S. PATENT DOCUMENTS

| | | | |
|---|---|---|---|
| 2006/0153287 | A1 | 7/2006 | Shen |
| 2006/0222247 | A1* | 10/2006 | Sherigar et al. ............... 382/233 |
| 2008/0310501 | A1* | 12/2008 | Ward et al. ............... 375/240.02 |
| 2009/0003718 | A1 | 1/2009 | Liu et al. |
| 2009/0041376 | A1 | 2/2009 | Carletta et al. |
| 2009/0110073 | A1* | 4/2009 | Wu et al. ................. 375/240.15 |
| 2009/0317017 | A1 | 12/2009 | Au et al. |
| 2010/0135393 | A1 | 6/2010 | Ying Gao |
| 2010/0183071 | A1* | 7/2010 | Segall et al. ............. 375/240.16 |
| 2010/0260260 | A1 | 10/2010 | Wiegand |
| 2011/0235720 | A1* | 9/2011 | Banterle et al. ......... 375/240.25 |
| 2011/0293013 | A1* | 12/2011 | Ma et al. ................. 375/240.16 |

FOREIGN PATENT DOCUMENTS

| | | |
|---|---|---|
| JP | 2011-501565 A | 1/2011 |
| WO | 2009052205 A1 | 4/2009 |
| WO | 2010003692 | 1/2010 |

OTHER PUBLICATIONS

Reinhard et al; "Photographic Tone Reproduction for Digital Images"; ACM Transactions on Graphics; vol. 21, No. 1; Jul. 1, 2002; pp. 267-276.

Mai, On-the-Fly Tone Mapping for Backward-Compatible High Dynamic Range Image/Video Compression, Department of Electrical and Computer Engineering, Department of Computer Science, University of British Columbia, Vancouver, BC, Canada; Aug. 3, 2010.

Wang et al., Design and Implementation of a Real-Time Global Tone Mapping Processor for High Dynamic Range Video, IEEE, Oct. 5, 2010.

Ansel Adams, The Print (Ansel Adams Photography Series/Book 3) Paperback—Jun. 1, 1995, Little, Brown and Company, abstract only.

Mantiuk et al; 'Perception-motivated high dynamic range video encoding', ACM Transactions on Graphics (TOG)—Proceedings of ACM SIGGRAPH, vol. 23 Issue 3, Aug. 2004 pp. 733-741.

G. Sullivan et al; 'New Standardized Extensions of MPEG4-AVC/H.264 for Professional-Quality Video Applications' Image Processing, Sep. 2007, IEEE International Conference, pp. 13-16.

G. Krawczyk et al: 'Proceedings of the 21st spring conference on Computer graphics', May 2005, ACM article 'Perceptual effects in real-time tone mapping', pp. 195-202; abstract only.

N. Goodnight et al, 'Interactive time-dependent tone mapping using programmable graphics hardware', Proceedings of the 14th Eurographics workshop on Rendering, Aug. 2003, Eurographics Association article, pp. 1-13.

Erik Reinhard et al; 'Photographic tone reproduction for digital images', Proceedings of the 29th annual conference on Computer graphics and interactive techniques, Jul. 2002, ACM Press pp. 267-276.

Jui-Chiu Chiang, et al., "Bit-Depth Scalable Video Coding Using Inter-Layer Prediction From High Bit-Depth Layer", Proc. of IEEE Int. Conf. on Acoustics, Speech and Signal Processing 2009 (ICASSP 2009), Apr. 24, 2009, p. 649-652, ISBN:978-1-4244-2353-8.

Segall, A.;"Scalable Coding of High Dynamic Range Video"; Proc. of IEEE Int. Conf. on Image Processing 2007 (ICIP 2007); Oct. 19, 2007; vol. 1; p. I-1~I-4; ISBN:978-1-4244-1437-6.

\* cited by examiner

HIGH DYNAMIC RANGE VIDEO TONE MAPPING

CROSS-REFERENCE TO RELATED APPLICATIONS

The present application claims the benefit under 35 U.S.C. § 119(e) of European Patent Application No. 10194489.0, filed Dec. 10, 2010. This application is herein incorporated by reference in its entirety.

BACKGROUND

The present specification generally relates to the High Dynamic Range (HDR) image processing and in particular to a system and a method for tone mapping a MPEG HDR video stream.

SUMMARY

In one example of the present specification, a method for tone-mapping a High Dynamic Range (HDR) data video stream encoded in MPEG format is disclosed, the encoded High Dynamic Range (HDR) data video stream comprising a frame sequence of intra-coded frames (I-Frames), predictive-coded frames (P-Frames), and bidirectionally-predictive-coded frames (B-frames), in which the method comprises decoding the HDR data video stream to generate decoded I-frames, auxiliary decoded data related to P-Frames, and auxiliary decoded data related to B-Frames. The method further comprises applying a tone mapping function to each decoded I-Frame to provide a tone-mapped I-Frame according to a tone mapping operator, for each P-frame depending on a reference I-frame, computing the tone-mapped P-frame from the tone-mapped I-Frame previously determined for the reference I-frame, the reference I-Frame, and the auxiliary decoding data related to the P-Frame; and for each B-frame, computing the tone-mapped B-frame from the tone mapped I-frame previously determined for the reference I-frame, the tone mapped P-frame previously determined for the reference P-frame, and the auxiliary decoding data related to the B-Frame.

In another example of the present specification, a computer program product for tone-mapping a High Dynamic Range (HDR) data video stream encoded in MPEG format is disclosed, the computer program product comprising a computer readable storage medium having computer usable program code embodied therewith, the computer usable program code comprising computer usable program code to decode the HDR data video stream to generate decoded I-frames, auxiliary decoded data related to P-Frames, and auxiliary decoded data related to B-Frames, computer usable program code to apply a tone mapping function to each decoded I-Frame to provide a tone-mapped I-Frame according to a tone mapping operator, computer usable program code to, for each P-frame depending on a reference I-frame, compute the tone-mapped P-frame from the tone-mapped I-Frame previously determined for the reference I-frame, the reference I-Frame, and the auxiliary decoding data related to the P-Frame, and computer usable program code to, for each B-frame, compute the tone-mapped B-frame from the tone mapped I-frame previously determined for the reference I-frame, the tone mapped P-frame previously determined for the reference P-frame, and the auxiliary decoding data related to the B-Frame.

In yet another example of the present specification, a system for tone-mapping a High Dynamic Range (HDR) data video stream encoded in MPEG format is disclosed comprising a processor to decode the data video HDR data stream to generate decoded I-frames, auxiliary decoded data related to P-Frames, and auxiliary decoded data related to B-Frames, apply a tone mapping function to each decoded I-Frame to provide a tone-mapped I-Frame according to a tone mapping operator, for each P-frame depending on a reference I-frame, compute the tone-mapped P-frame from the tone-mapped I-Frame previously determined for the reference I-frame, the reference I-Frame, and the auxiliary decoding data related to the P-Frame, and, for each B-frame, compute the tone-mapped B-frame from the tone mapped I-frame previously determined for the reference I-frame, the tone mapped P-frame previously determined for the reference P-frame, and the auxiliary decoding data related to the B-Frame.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
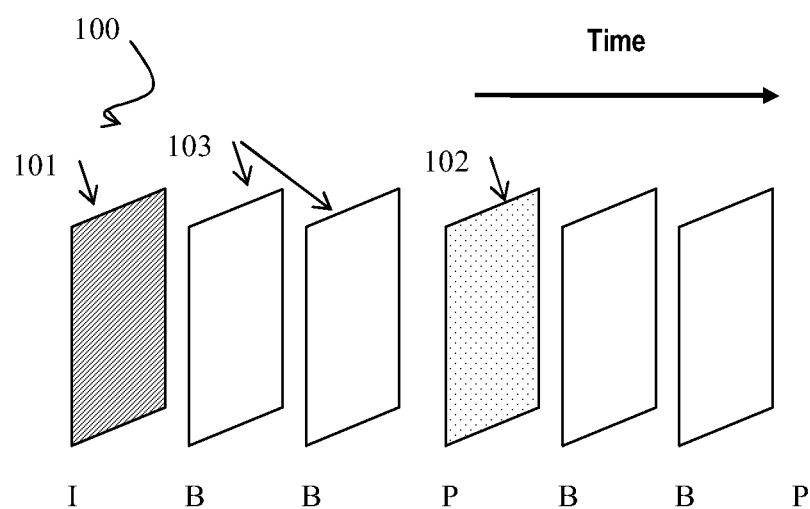
FIG. 1 is a diagram of a sequence of MPEG frames according to one example of principles described herein.

The quality of digital images has dramatically improved over the past few years. The number of pixels in a picture has also increased with the advent of improved cameras and displays. However, with the increase of the number of pixels in a high definition (HD) picture and the improved dynamic information in a high dynamic range (HDR) picture, an increasing amount of data is associated with digital pictures. Consequently, due to this large amount of data it could be difficult to display these images. For still images, tone mapping techniques may be used that allow reduction of the dynamic range of a picture in a way that allows the user to observe all details relevant to the human eye. However, for video data consisting of a plurality of frames, existing solutions suffer from a number of limitations.

Indeed, the display of high definition (HD), high dynamic range (HDR) video on conventional displays (8-bit displays) involves a number of technical difficulties. A high dynamic range (HDR) video has dynamic range of luminance comparable to that of a real scene which is much larger than that displayed on standard, low dynamic range (8-bit) displays. In order to display this high dynamic range (HDR) content on a standard, low dynamic range (8-bit) display, the dynamic range is compressed using a 'tone mapping' operation. This still gives a similar visual experience than that of visualizing the real scene. However, high quality tone mapping operators use relatively more processing power to sustain the typical frame rate of 60 frames per second and high image resolution of 1920×1080 for High Definition video.

One approach to allow for real-time display of HDR video has not been to perform tone-mapping in real time but instead to use a pre-tone mapped video stream embedded into the HDR stream. This approach has been described in U.S. Patent 20080310501, U.S. Patent 20090003718, in the article entitled "Perception-motivated high dynamic range video encoding" (*ACM SIGGRAPH* 2004 *Papers*; Los Angeles, Calif.: ACM, 2004, pp. 733-741) by R. Mantiuk, G. Krawczyk, K. Myszkowski, and H. Seidel, and also in the article "New Standardized Extensions of MPEG4-AVC/H.264 for Professional-Quality Video Applications" (Image Processing, 2007. ICIP 2007. IEEE International Conference on, 2007, pp. I-13-I-16) by G. Sullivan, Haoping Yu, S. Sekiguchi, Huifang Sun, T. Wedi, S. Wittmann, Yung-Lyul Lee, A. Segall, and T. Suzuki. Consequently, by implementing this approach, tone mapping is not used and instead HDR video is simply produced by decoding the tone-mapped stream. This approach, however, has the major disadvantage of "off-line" tone mapping. Off-line tone mapping limits the applicability of this approach to pre-recorded videos and therefore does not allow for live TV broadcasting. Moreover, the tone mapping operator is a preselected or predetermined operator and cannot be changed.

Another approach is the one taken in the article "Perceptual effects in real-time tone mapping" (*Proceedings of the 21st spring conference on Computer graphics*, Budmerice, Slovakia: ACM, 2005, pp. 195-202, by G. Krawczyk, K. Myszkowski, and H. Seidel, and in the article "Interactive time-dependent tone mapping using programmable graphics hardware", *Proceedings of the 14th Eurographics workshop on Rendering*, Leuven, Belgium: Eurographics Association, 2003, pp. 26-37, by N. Goodnight, R. Wang, C. Woolley, and G. Humphreys). This approach approximates a particular tone mapping operation and relies on high performance computing, such as graphics processing units, to perform tone mapping in real-time. However, this approach has the disadvantage of potentially decreasing the tone mapping quality in order to allow for real time processing. This approach also implements high power/high cost underlying hardware in order to achieve an acceptable quality tone mapping. Further, solutions applying this approach are usually highly tuned for a specific tone mapping operator, making it difficult to change the tone mapping operator to match the intending viewing characteristics (for example emphasizing details rather than having a perceptually pleasing image).

Yet another solution has been described in the article "Method for real-time implementable local tone mapping for high dynamic range images" by J. Carletta and H. Firas. This solution builds a custom hardware implementation that performs tone mapping in real-time. However, this solution generally relies on significant approximation of the tone mapping operator in order to decrease the hardware cost. Also, the hardware is application/tone mapping specific, increasing the implementation cost as the hardware cannot be used for other functions. Therefore, in light of the above, displaying HDR video on conventional displays has proven to be highly limited.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Multimedia devices generally implement video coding techniques, such as MPEG-2, ITU-H.263, and MPEG-4, among others to transmit, receive, store or retrieve digital content. Among these encoding techniques, the MPEG international standard has been extended to compress HDR video stream, as described in "New Standardized Extensions of MPEG4-AVC/H.264 for Professional-Quality Video Applications", *Image Processing*, 2007. ICIP 2007. *IEEE International Conference on*, 2007, pp. I-13-I-16, by G. Sullivan, Haoping Yu, S. Sekiguchi, Huifang Sun, T. Wedi, S. Wittmann, Yung-Lyul Lee, A. Segall, and T. Suzuki. An MPEG data stream may comprise a video stream that may be packed with an audio stream and other bit streams.

FIG. 1 is a diagram of a sequence (100) of MPEG frames according to one example of principles described herein. The MPEG sequence (100) comprises frames taken at intervals. In FIG. 1, the frames have been designated by the way temporal information is encoded.

MPEG encoding is utilized to generate a frame sequence comprising a plurality of frames having different types of frames. More specifically an MPEG frame sequence comprises logical groups, each group comprising three types of frames: intra-coded frames (I-frames) (101), predictive-coded frames (P-frames) (102), and bidirectionally-predictive-coded frames (B-frames) (103).

The I-frame (101) in FIG. 1 is a compressed version of a single uncompressed frame. It may rely on intra-frame data for encoding, without reference to other types of frames (i.e. no temporal encoding of redundancy). Unlike P-frames (102) and B-frames (103), I-frames (101) do not depend on data associated with the preceding or the succeeding frames.

The P-frame (102) relies on prediction from an earlier I frame (101). B frames (103) are temporally encoded via a previous I-frame (101) and a next P-frame (102). As shown in FIG. 1, a typical sequence of frames is as follows: I B B . . . B P. In certain MPEG applications, I-frames may occur every fifteenth ($15^{th}$) frame within the HD video stream.

For the frame or frames (P-frames and B-frames) that follow a reference frame (I or P frames), small portions of these frames are different from the corresponding portions of the respective reference frame. For these referenced frames, the differences are captured and stored using motion vectors. To enable backward prediction from a future frame, the encoding device generally reorders the frames from the display order to the bitstream order so that a B-picture is transmitted after the previous and next frame it references.

An MPEG video encoding unit performs two main operations. The first operation performed by the MPEG video encoding unit is to encode the temporal redundancy of data across the MPEG frames. For a given frame block, the encoder searches for two matching blocks from a previous frame and a next frame. The current frame block is then subtracted from the matched two blocks.

The second operation performed by the MPEG video encoding unit is the encoding of spatial redundancy inside each frame after the temporal reduction operation. An intra-frame Discrete Cosine Transform (DCT) operation and a motion-compensated inter-frame prediction operation are used in addition to a quantization method to encode the spatial redundancy.

In the MPEG encoder, the motion-compensated inter-frame prediction is first determined and combined to the DCT. The motion-compensated prediction is subtracted from the source picture to form a 'prediction error' picture and then the prediction error is transformed with the DCT. The coefficients are then quantised and these quantised values encoded using a Variable Length Encoding (VLC). The coded luminance and chrominance prediction error is combined with "side information" used by the decoder, such as motion vectors and synchronising information, and formed into a bitstream for transmission.

The now encoded HDR data stream (also referred to thereinafter as "bitstream") comprises a number of horizontal slices, each including a number of macroblocks. Each macroblock comprises, among other information, a quantisation value, motion vectors, luminance, and chrominance blocks of quantised DTC coefficients.

The tone mapping method according to the various examples of the present specification allows an efficient display of an HDR video data stream encoded according to MPEG format. The tone-mapping method applies a tone map operator to tone map I-frames (101), while tone mapping P-frames (102) and B-frames (103) based on the tone mapped frames previously determined for the reference frames (I and P frames), and information resulting from the MPEG decoding of the HDR video data stream.

Figure 2:
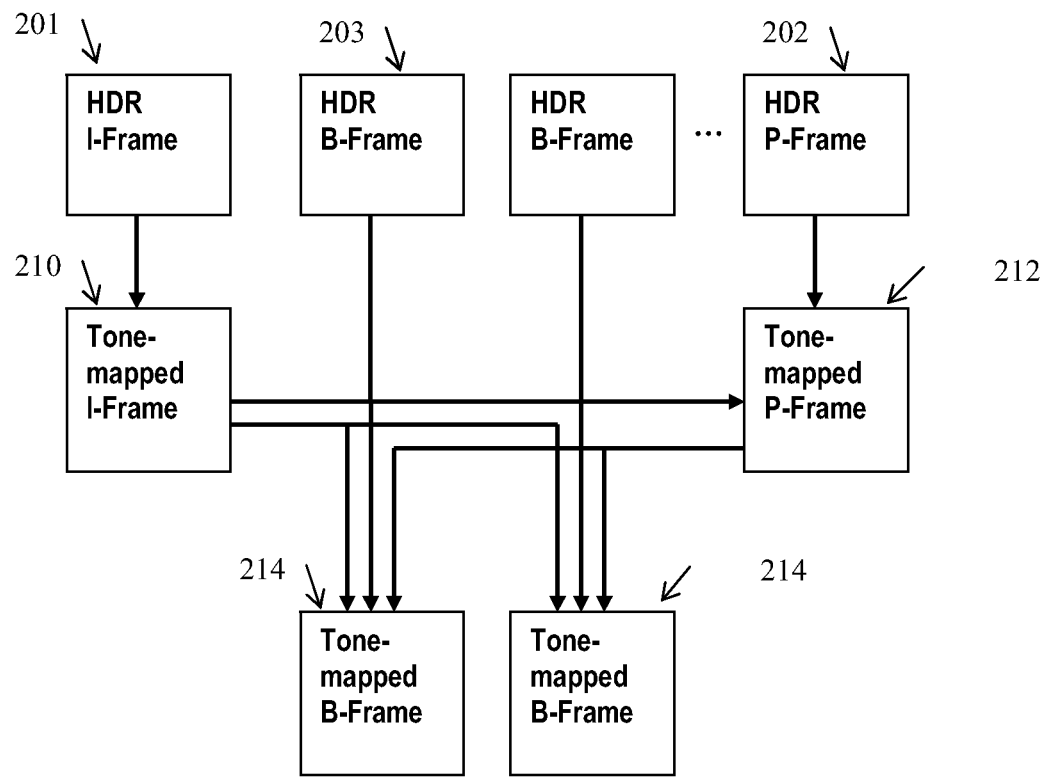
FIG. 2 is a diagram of a tone mapping method performed on MPEG frames according to one example of principles described herein.

FIG. 2 is a diagram of a tone mapping method performed on MPEG frames according to one example of principles described herein. FIG. 2 schematically depicts the phases of the tone mapping method. When an I-Frame of the HDR bitstream is received, a tone mapped operation is applied to the I-Frame (201) of the input data stream into a tone mapped I-Frame (210) according to a tone mapping technique. The tone-mapped I-Frame is stored in memory to allow differential computation of tone-mapping values for the frames it references (P-Frames or B-Frames).

Therefore, as a result, while the intra-frame involves a full tone mapping operation, a "differential" tone-mapping of dependent frames (P-Frames and B-Frames) may be accomplished based on additions and scaling operations related to tone-mapped I-Frame values obtained for the I-Frame which serves as a reference frame. More specifically, when a P-Frame (202) is received which depends on a reference I-Frame, tone mapped values for the P-Frame are computed using addition and scaling functions related to the tone-mapped I-Frame (210) obtained for the reference I-Frame and other information related to the MPEG decoding of the bitstream. This provides a tone-mapped P-Frame (212). The tone-mapped P-frame values are stored in memory to allow differential computation of tone-mapping values for the frames it references (B-Frames).

When a B-Frame (203) is received which depends on a given I-Frame and P-Frame, tone-mapped values for the B-Frames are differentially computed based on the tone-mapped I-Frame (210) obtained for the reference I-Frame, the tone-mapped P-Frame (212) obtained for the reference P-Frame, and additional information related to the MPEG decoding of the bitstream. This provides a tone-mapped B-Frame (214) without involving an actual tone mapping operation on the frame, thereby saving significant computation time, memory, and power.

Accordingly, the tone mapping method according to the various examples of the present application provide a one tone-mapping operation for the Intra-frames. For the frames that follow a reference frame (P-Frames and B-frames), the computation of corresponding tone mapped frames simply involves a number of additions and scaling that do not contribute to the complexity of decoding time. The HDR video data stream can then be transformed into a sequence of frames adapted to be displayed on conventional display devices, with lower computation costs and with an improved speedup.

Figure 3:
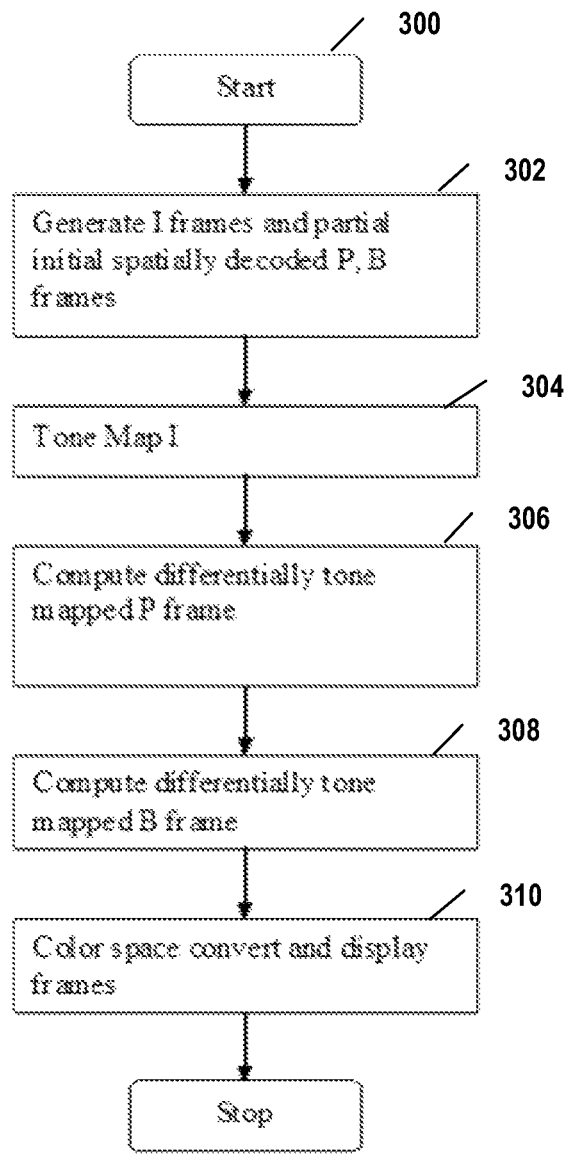
FIG. 3 is a flowchart showing a method for displaying a High Dynamic Range (HDR) video data stream encoded in MPEG according to one example of principles described herein.

FIG. 3 is a flowchart showing a method for displaying a High Dynamic Range (HDR) video data stream encoded in MPEG according to one example of principles described herein. The method begins (block 300) with the reception of a HDR video data stream according to MPEG format. In one example, the input video stream may be received from any type of encoding device adapted to encode an original video data stream into MPEG format. In another example, the input video stream may be received from a data store storing video data stream in MPEG format such as hard disks and optical disks among others. The encoding device may be a general purpose computer which receives an original video data stream from any type of source such as a satellite receiver or a video camera.

The HDR video data stream in MPEG format comprises variable-length codes which were obtained during the MPEG encoding process. After the HDR video data stream is received, MPEG decoding operations are applied (block 302) to the HDR bitstream. The MPEG decoding process decodes and stores each received frame which serves as a reference for other frames, such as I- or P-frames. Each newly reconstructed frame serving as a reference frame, such as an I-Frame or a P-frame, replaces the previously stored reference frame to serve as the new reference for incoming frames. A P-frame or a B-frame that depends on a reference frame is reconstructed using a motion compensation function which is applied on the frame using the neighbouring decoded reference frames (I-Frame and/or P-Frame). The frames depending on reference frames (such as P-frames and B-frames) are associated with respective motion vectors which reference blocks in neighbouring decoded reference frames (I-frame or P-Frame). The MPEG decoder uses each motion vector to determine a corresponding reference block in each reference frame (I-Frame or P-Frame) so as to access the reference block pointed to by the motion vector. Accordingly, a P-frame is reconstructed from the associated reference I-frame which has been previously decoded and cached in a picture buffer and a B-frame is reconstructed from the two associated reference frames (I-Frame and P-Frame) which have been previously decoded and cached in a picture buffer.

The MPEG decoding (block 302) thereby generates I-frame (full values), reconstructed P-Frames and reconstructed B-Frames. It also provides intermediary error values $e_p(x,y)$ for each received P-frame as well as error values $e_b(x,y)$ for each received B-frame. The error values $e_p(x,y)$ represent the error value in a P frame at pixel location (x,y) and, similarly, the error values $e_b(x,y)$ represent the error value in a B-frame at pixel location (x,y). The error values for the P and B frames are originally encoded by the MPEG encoder. The MPEG decoder uses an Inverse Discrete Cosine Transform to decode the P and B frames. Errors are used typically in a motion compensation operation to reconstruct the original frames of the video data stream, the value of which is therefore an error or a difference between the original pixel value and a temporal reconstructed value that is obtained by using pixel values from other frames to compute a current frame pixel.

More specifically, MPEG decoding (block 302) applies a variable-length decoding function to recover the run, level, and length of each variable-length code, according to the MPEG encoding standard used and the frame type. Variable-length codes may be decoded using a table look-up technique or any suitable technique. The MPEG decoding (block 302) also includes assigning the coefficients from the variable length decoding function into macroblocks (e.g. 8*8 pixels) and applying an inverse quantisation function to multiply each coefficient in a macroblock by the same corresponding quantization constant as used in the quantization phase of the encoding. Additionally, the result is rounded to the nearest integer. The MPEG decoding (block 302) also applies an inverse discrete cosine transform (DCT) function to the macroblocks to return the blocks to a time/spatial domain representation. This provides the I-Frame and the error values e(x,y) for P-Frames and B-Frames. For each received P-Frame or B-Frame, MPEG decoding (block 302) also uses the associated motion vector or vectors to provide reconstructed P-Frames and B-Frames.

Each I-Frame decoded (block 302) is then tone mapped (block 304) according to any suitable tone mapping technique. In the following description, the I-frame pixel value at location (x,y) will be referred to as I(x,y), while the tone mapped value of the I-frame at a given pixel (x,y) will be referred to as $I1(x,y)$ at pixel location (x, y). The tone-mapped I-Frame I1 can be generated using a suitable tone mapping operator such as for example the Reinhard et al. photographic tone mapping operator (Erik Reinhard, Michael Stark, Peter Shirley, and James Ferwerda. *Photographic tone reproduction for digital images*, SIGGRAPH '02: Proceedings of the 29th annual conference on Computer graphics and interactive techniques, pages 267-276, New York, N.Y., USA, 2002. ACM Press). The Reinhard et al. photographic tone mapping operator is a local adaptive operator incorporating the classical Ansel Adams dodging-and-burning technique (Ansel Adams, The Print, The Ansel Adams Photography Series/Book 3, Little, Brown and Company, tenth edition, 2003, with the collaboration of Robert Balker), that is based on common photographic principles, to tone map each individual pixel. Any tone mapping operator can be used as long as tone mapping happens spatially (within one frame). This is generally satisfied by most tone mapping operators. The present specification also applies to tone mapping operators for which a time adaptation method may be performed (after the spatial tone mapping) to adapt for luminance changing with time. When such time adaptation relies on a current tone mapped frame and time information, an extra time operator may be performed on the frame. However, the overhead of such operations is insignificant compared to the tone mapping operation. An example of a temporal adaption method is described in "Perceptual effects in real-time tone mapping" (*Proceedings of the 21st spring conference on Computer graphics*, Budmerice, Slovakia: ACM, 2005, pp. 195-202) by G. Krawczyk, K. Myszkowski, and H. Seidel.

The tone mapped P-Frame $P1(x,y)$ is then differentially computed (block 306) for a received P-Frame following a reference I-Frame from the value of the tone mapped I-Frame $I1(x',y')$ obtained at a corresponding location (x',y') for the reference I-Frame (according to block 304), and a scaling factor related to the error signal $e_p(x,y)$ encoded for the P-frame as obtained earlier (block 302) (using inverse quantisation and discrete cosine transform functions). A motion vector associated with the P-frame can be used to determine the pixel location (x',y') at the reference I-frame corresponding to the pixel location (x,y) at the P-frame. The motion vector may be provided by the variable length decoding function used during the decoding of the MPEG video data stream.

The tone mapped B-Frame value $B1(x,y)$ at pixel location (x,y) is then computed (block 308) for a received B-Frame. The differently tone mapped b-frame is computed (block 308) depending on a reference I-Frame and a reference P-Frame from the value of the tone-mapped I-Frame $I1(x',y')$ obtained for the reference I-frame at a first predetermined location (x',y'), the value of tone mapped P-Frame $P1(x'',y'')$ obtained for the reference P-frame at a second predetermined location (x'',y'')), and a scaling factor related to the error signal $e_b(x,y)$ encoded for the B-frame as obtained earlier (block 302) (using inverse quantisation and discrete cosine transform functions). The first predetermined location (x',y') is the pixel location at the reference I-frame corresponding to the pixel location (x,y) of the B-frame, and the second predetermined location (x'',y'') is the pixel location at the reference P-frame corresponding to the pixel location (x,y) of the B-frame. The first predetermined location (x', y') may be determined using the motion vector associated with the reference I-frame. The second predetermined location (x'', y'') may be determined from the motion vector associated with the reference P-frame. These two motions vectors can be produced by the video length decoding (VLC) function applied at the beginning of the MPEG decoding of the video data stream (block 302).

After the differently tone mapped b-frame is computed (block 308), a color space conversion of the HDR video data stream is performed (block 310) from the tone mapped I-Frames obtained earlier (block 304) ($I1(x,y)$), the tone mapped P frames ($P1(x, y)$) also obtained earlier (block 306) and the tone mapped B-Frames ($B1(x,y)$) also obtained earlier (block 308). In one example, conversion may be made to an RGB standard color space in which the color of each pixel is represented by three components, namely Red (R), Green (G), and Blue (B). In another example, the conversion may be made to the Luv color space, wherein "L" is the luminance component, and "u" and "v" are each a chrominance component.

Figure 4:
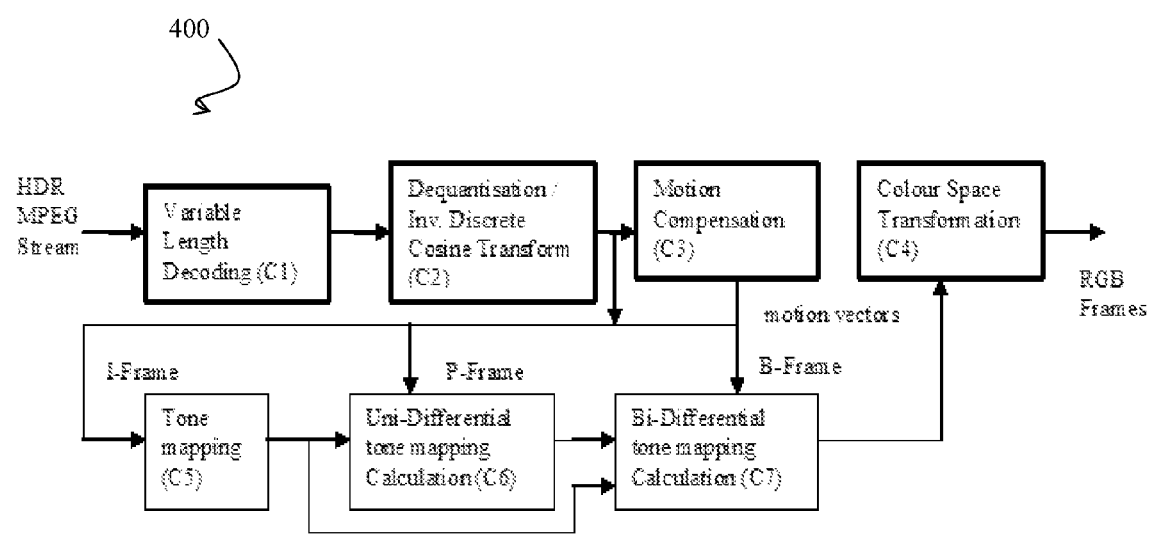
FIG. 4 is a block diagram representing a displaying system for decoding and tone mapping a High Dynamic Range (HDR) video stream according to one example of principles described herein.

FIG. 4 is a block diagram representing a displaying system (400) for decoding and tone mapping a High Dynamic Range (HDR) video stream according to one example of principles described herein. The displaying system (400) takes an HDR MPEG stream as an input. It is coupled to a display device for displaying the video data stream based on data extracted from reference I-frames and information extracted from a temporally compressed or encoded P-frames and/or B-frames.

The HDR video data stream encoded in MPEG format comprises "slices". Each slice represents a horizontal section of an image frame and comprises a sequence of macroblocks. Each macroblock includes a macroblock header, a motion vector section, and coded blocks of Discrete Cosine Transform (DCT) coefficients. The motion vector section is used to produce the motion vectors for the macroblock.

The system (400) comprises a variable length decoding block (C1) for a first processing of the HDR MPEG stream. The variable length decoding block (C1) performs standard variable length decoding on the HDR MPEG stream to provide quantized discrete cosine transform (DCT) coefficients (e.g. by using predetermined Huffman table). An inverse scan function (not shown) assigns the coefficients from the variable length decoding block (C1) into blocks (e.g. 8*8 blocks)).

The transform block (C2) then performs inverse quantization and inverse discrete cosine transform operations. The inverse quantization operation multiplies each coefficient in a block provided from the inverse scan function by the same corresponding quantization constant as used in the quantization procedure during encoding and rounds the result to the nearest integer. The inverse discrete cosine transform operation is applied to the blocks to return the blocks to a spatial domain representation (forming an image difference block). One of the functions of the inverse DCT operation according to certain examples of the present specification comprises, in particular, is decoding the errors signals associated respectively with the P and B frames (which were originally encoded by the MPEG encoder).

The encoded motion vectors and error signals are then transmitted to a motion compensation block (C3). The motion compensation block (C3) is used to decode the error signals associated respectively with the P and B frames (referred to thereinafter as $e_p(x,y)$ and $e_b(x,y)$ for P and B frames), the encoded set of motion vectors for each P-frame (associated with the reference I-Frame), and the two sets of encoded motion vectors for each B-frame (associated with the reference I-Frame and P-Frame). In MPEG decoders, each motion vector is generally used to retrieve a reference image block that is combined with the output of the inverse discrete cosine transform operation to produce a decoded image block. The motion compensation block (C3) thus provides reconstructed P-Frames and B-Frames. However, in accordance with the examples of the present specification, the motion compensation block (C3) is mainly used to decode the error signals and the motion vectors to supply them to Uni-Differential Tone Mapping Calculation (C6) and Bi-Differential Tone Mapping Calculation (C7) blocks.

Blocks C2 and C3 are accordingly used to generate I-frames (full values), error signal values $e_p(x,y)$ and $e_b(x,y)$ for P-Frames and B-frames, and provide decoded motions vectors. Each decoded I-frame from transform block (C2) is fed into a Tone Mapping block (C5). The tone mapping block is provided to perform a tone mapping operation on I-Frames according to a suitable tone-mapping technique. The tone mapping operation is performed to map one set of colors to another and approximate the appearance of the HDR video. The values $I1(x,y)$ obtained from the tone mapping block (C5) (toned-mapped I-Frame) are fed into the Uni-Differential Tone Mapping Calculation Block (C6) and Bi-Differential Tone Mapping Calculation Block (C7) for differential computation of tone-mapped values for the P-frames and B-frames it references.

For each decoded P-Frame, the tone mapped I-frame associated with its reference I-Frame (obtained from Block C5), the error value encoded $e_p(x,y)$ at the P-frame (obtained from block C2), the P-frame motion vector, and the reconstructed P-Frame (received from C3) are used by a Uni-Differential Tone Mapping Calculation block (C6) (referred to as "Uni-differential" with respect to the earlier I frame which serves as the reference frame for the P-Frame) to compute tone-mapped values for the P-frame. The Uni-Differential Tone Mapping Calculation block (C6) computes values for the tone-mapped P-Frame from the tone-mapped I-frame values according to the following equation:

$$P_1(x,y)=I_1(x',y')+e_p(x,y)*I_1(x',y')/I(x',y') \quad \text{(Eq. 1)}$$

where $P_1(x,y)$ is the tone mapped P-frame pixel value at location (x,y), $e_p(x,y)*I_1(x',y')/I(x',y')$ is the scaling factor, $I(x',y')$ is the I-frame pixel value at location (x',y') in the I frame, $e_p(x,y)$ is the error value encoded in P-frame at location (x,y), and $I_1(x',y')$ is the tone mapped value of the reference I-frame previously determined by tone mapping block C5. The location (x',y') is determined by the P-Frame motion vector.

The error signal $e_p(x,y)$ is measured as the accumulated absolute differences $e_p(x,y)$. Alternatively, if the error signal $e_p(x,y)$ is high (i.e. superior to a predefined threshold), the entire P-frame may be tone mapped fully without approximation.

For each decoded B-Frame, the tone mapped I-frame $I1(x,y)$ previously determined for the reference I-Frame (obtained from C5), the tone mapped P-frame $P1(x,y)$ previously determined for the reference P-Frame (obtained from C5), the error value $e_b(x,y)$ at the B-frame (obtained from block C2), the two motion vectors associated respectively with the reference I-Frame and P-Frame, and the reconstructed reference P-Frame are used by a Bi-Differential Tone Mapping Calculation block (C7) (C7 is referred to as bi-differential with respect to the reference I-Frames and P-frames) to compute tone mapping values $B1(x,y)$ for the B-frame according to the following equation:

$$B_1(x,y)=I_1(x',y')+P_1(x'',y'')+e_b(x,y)*(I_1(x',y')+P_1(x'',y''))/(I(x',y')+P(x'',y'')) \quad \text{(Eq. 2)}$$

where $B_1(x,y)$ is the tone mapped value of pixel (x,y) at B-frame, $I_1(x',y')$ is the corresponding pixel at the tone mapped I-frame, $P_1(x'',y'')$ is the corresponding pixel value at the tone mapped P-frame, and $e_b(x,y)$ is the error (pixel) value of the B-frame. The corresponding pixel location (x',y') at reference I-Frame is determined with the motion vector of the B-Frame associated with the reference I-Frame, and the corresponding pixel location (x'',y'') at reference P-Frame is determined with the motion vector of the B-Frame associated with the reference P-Frame.

Alternatively, if the error signal (measured as the accumulated absolute differences $e_b(x,y)$) is high (i.e. superior to a predefined threshold), the entire B-frame is tone mapped fully (using the tone mapping operator) without approximation, otherwise the tone mapped is computed differentially (i.e. with approximation).

Originally the I-Frames, P-Frames and B-Frames in the MPEG stream are in HSB space, where pixel components represent "hue", "saturation", and "brightness" or luminance. The system (400) comprises a color space transformation block (C4) which receives the computed frames (tone-mapped I, P and B-Frames) and transform them back to the RGB space to match the display color space. This provides a tone mapped RGB image that can be displayed.

In one example of the present specification where each frame requires an average of $t_1$ time for tone mapping, and $t_2$ time for video decoding, a tone mapping operation is used for I-frames. For P-Frames and B-frames, the tone mapping involves a number of additions and scaling that do not contribute to the complexity of decoding time $t_2$. Therefore, time $t_1$ is incurred for I-frames and P-frames for the tone mapping operation. If I-frames occur every n frames, the total execution time $T_a$ is therefore $T_a=t_1+t_2$. As decoding methods are performed in real-time, $t_2$ is relatively small.

Advantageously, the tone mapping operation is sped up with respect to existing techniques where tone mapping is done for every frame independently from the others. Indeed, considering time $T_b=n\,t_1+t_2$, where $T_b$ represents the total execution time when tone mapping is done on each frame, the resulting speedup S is accordingly as follows:

$$S=T_b/T_a=(nt_1+t_2)/(t_1+t_2) \quad \text{(Eq. 3)}$$

Since $t_2$ is usually a relatively small number ($<<t1$), $T_b/T_a=n$. Error values are correlated with rapid scene changes. MPEG encoders usually insert I-Frames at such frames, so that errors are likely to be small. MPEG encoders usually insert an I-Frame every 15 frames. For such an example, n=15 (e.g. PAL DVD). 15× speed up can be therefore expected. The main overhead introduced is mainly the tone mapping operation for frame I. Other overheads may include checking for the error threshold, which is negligible.

Figure 5:
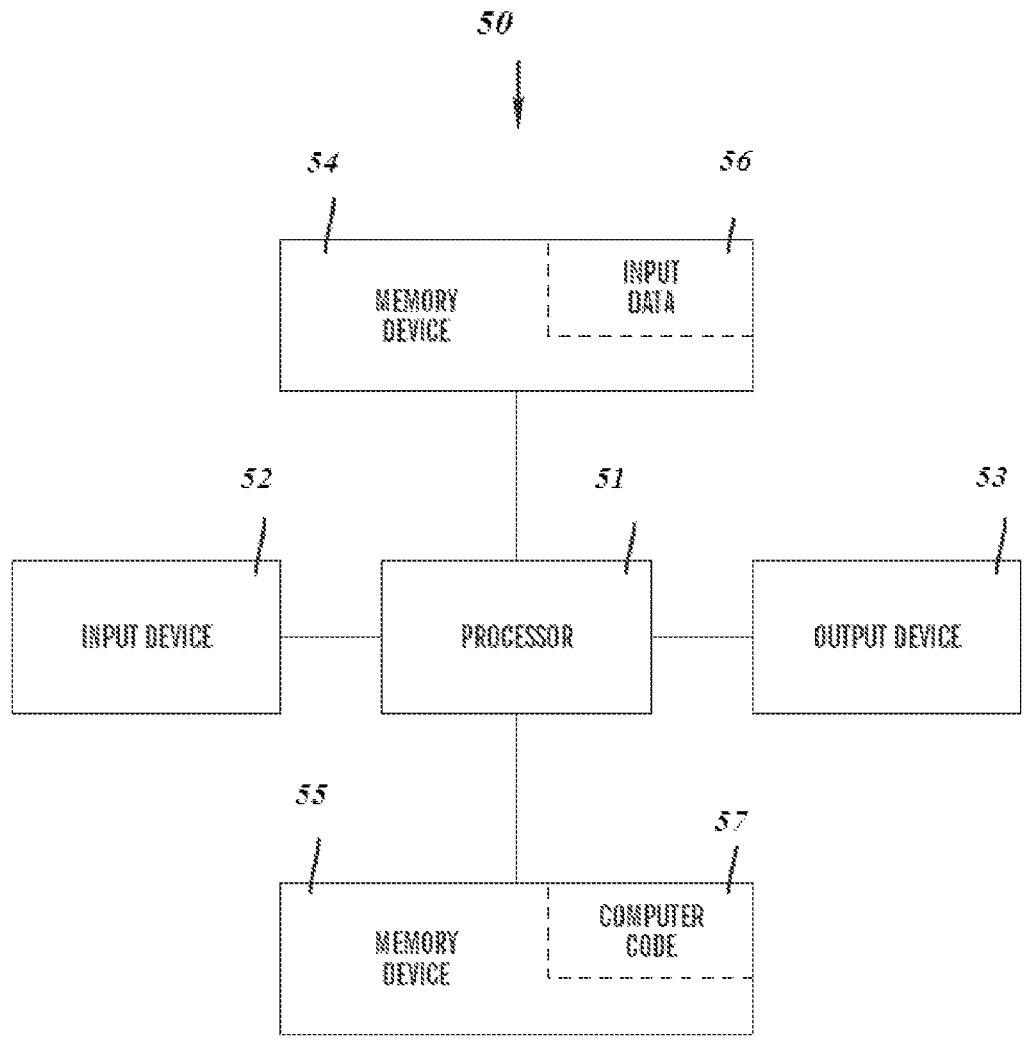
FIG. 5 is a block diagram showing a computer system used for transforming a video image from an MPEG HDR image into a color space converted image, according to one example of principles described herein.

FIG. 5 is a block diagram showing a computer system (50) used for transforming a video image from an MPEG HDR image into a color space converted image, according to one example of principles described herein. The computer system (50) comprises a processor (51), an input device (52) coupled to the processor (51), an output device (53) coupled to the processor (51), and memory devices (54 and 55) each coupled to the processor (51). The processor (51) is a processing unit such as a central processing unit (CPU).

The input device (52) may be, inter alia, a keyboard, a mouse, etc. The output device (53) may be, inter alia, a printer, a plotter, a display device (e.g., a computer screen), a magnetic tape, a removable hard disk, a floppy disk, etc. The memory devices (54 and 55) may be, inter alia, a hard disk, a floppy disk, a magnetic tape, an optical storage such as a compact disc (CD) or a digital video disc (DVD), a dynamic random access memory (DRAM), a read-only memory (ROM), etc.

The memory device (55) includes a computer code (57) which is a computer program that comprises computer-executable instructions. The computer code (57), when executed by the processor (51), transforms the MPEG HDR image into a colour space image. The memory device (54) includes input data (56). The input data (56) includes input by the computer code (57). The output device (53) displays output from the computer code (57). Either or both memory devices (54 and 55) may be used as a computer usable storage medium (or program storage device) having a computer readable program embodied therein and/or having other data stored therein, wherein the computer readable program comprises the computer code (57). Generally, a computer program product (or, alternatively, an article of manufacture) of the computer system (50) may comprise the computer usable storage medium (or the program storage device).

While FIG. 5 shows the computer system (50) as a particular configuration of hardware and software, any configuration of hardware and software may be utilized for the purposes stated supra in conjunction with the particular computer system (50) of FIG. 5. For example, the memory devices (54 and 55) may be portions of a single memory device rather than separate memory devices.

While particular examples of the present specification have been described herein for purposes of illustration, many modifications and changes will become apparent to those skilled in the art.

The specification and figures describe a method for tone-mapping a High Dynamic Range (HDR) data video stream encoded in MPEG format. The method includes decoding an HDR data video stream.

This method and system for tone-mapping a High Dynamic Range (HDR) data video stream encoded in MPEG format comprises generating decoded I-frames, auxiliary decoded data related to P-Frames, and auxiliary decoded data related to B-Frames. The method further comprises applying a tone mapping function to each decoded I-Frame to provide a tone-mapped I-Frame according to a tone mapping operator. The method further comprises, for each P-frame depending on a reference I-frame, computing the tone-mapped P-frame from the tone-mapped I-Frame previously determined for the reference I-frame, the reference I-Frame, and the auxiliary decoding data related to the P-Frame. The method also comprises, for each B-frame, computing the tone-mapped B-frame from the tone mapped I-frame previously determined for the reference I-frame, the tone mapped P-frame previously determined for the reference P-frame, and the auxiliary decoding data related to the B-Frame. This method may have a number of advantages, including speeding up the operation of video tone mapping by a factor comparable to the video frame rate (e.g. 15× speed up for frame rates of 60 frames per second for high definition video stream). The method also allows for the selection of any tone mapping operator for the intra-frame tone mapping. Further, the present method and system allows the association of the quality of the tone mapping with the quality of the MPEG video compression.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for tone-mapping a High Dynamic Range (HDR) data video stream encoded in MPEG format, the encoded High Dynamic Range (HDR) data video stream comprising a frame sequence of intra-coded frames (I-Frames), predictive-coded frames (P-Frames), and bidirectionally-predictive-coded frames (B-frames), the method comprising:
    decoding the HDR data video stream to generate decoded I-frames, auxiliary decoded data related to P-Frames, and auxiliary decoded data related to B-Frames where the auxiliary decoded data includes an error signal representing an error value at a pixel location, the method further comprising:
        i—applying a tone mapping function to each decoded I-Frame to provide a tone-mapped I-Frame according to a tone mapping operator,
        ii—for each P-frame depending on a reference I-frame, computing the tone-mapped P-frame from the tone-mapped I-Frame previously determined for the reference I-frame, the reference I-Frame, and the auxiliary decoding data related to the P-Frame; and
        iii—for each B-frame, computing the tone-mapped B-frame from the tone mapped I-frame previously determined for the reference I-frame, the tone mapped P-frame previously determined for the reference P-frame, and the auxiliary decoding data related to the B-Frame.

2. The method of claim 1, in which computing the tone-mapped P-frame comprises:
    computing the tone-mapped value for the P-frame at a given pixel location (x,y) of the P-Frame from the value $I_1(x',y')$ of the tone-mapped I-Frame at a predetermined pixel location (x',y') at the reference I-Frame corresponding to the pixel location (x, y), the value I(x',y') of the reference I frame at the predetermined location (x',y'), and the auxiliary decoding data related to the P-Frame.

3. The method of claim 2, in which the auxiliary data related to the P-frame comprises a decoded error signal $e_p$ for the P-frame and in which decoding the data video HDR data stream comprises decoding the error signal $e_p$ from the MPEG video data stream using an inverse Discrete Cosine transform function.

4. The method of claim 3, in which computing the tone-mapped P-frame comprises scaling the error signal $e_p$ related to the P-Frame by the ratio $I_1(x',y')/I(x',y')$.

5. The method of claim 4, in which the tone-mapped value for the P-frame $P_1(x,y)$ at a given pixel location (x,y) is determined according to the following equation:

$$P_1(x,y)=I_1(x',y')+e_p(x,y)*I_1(x',y')/I(x',y').$$

6. The method of claim 2, in which the auxiliary decoding data further comprises one set of decoded motion vectors for each P-Frame associated with the reference I-Frame, and computing the tone-mapped P-frame comprises determining the predetermined location (x',y') from the set of decoded motion vectors associated with the reference I-frame.

7. The method of claim 6, in which the sets of motion vectors are produced from the MPEG video data stream, and the decoding comprises applying a motion compensation function to decode the sets of motion vectors.

8. The method of claim 1 in which computing the tone-mapped B-frame comprises:
   computing the tone-mapped value for the B-frame $B_1$ (x,y) at a given pixel location (x,y) of the B-Frame from the value $I_1$ (x',y') of the tone mapped I frame at a first predetermined pixel location (x',y') of the reference I-Frame corresponding to the pixel location (x,y), the value $P_1$ (x'',y'') of the tone mapped P-frame at a second predetermined pixel location (x'',y'') of the reference P-Frame corresponding to the pixel location (x,y), the value I(x',y') of the reference I frame at the first predetermined location (x',y'), and the auxiliary decoding data related to the B-Frame.

9. The method of claim 8, in which the auxiliary data related to each B-frame comprises a decoded error signal $e_b$ and in which decoding the data video HDR data stream comprises decoding the error signal $e_b$ from the MPEG video data stream using an inverse Discrete Cosine transform function.

10. The method of claim 9, in which computing the tone-mapped B-frame comprises scaling the error signal $e_b$ related to the B frame by the ratio $I_1((x',y')+P_1(x'',y''))/(I(x',y')+P(x'',y''))$, where P(x'',y'') represents the reconstructed value of the reference P-Frame at the second predetermined location.

11. The method of claim 10, in which the tone-mapped value for the B-frame $B_1$ (x,y) at a given pixel location (x,y) is determined according to the following equation:

$$B_1(x,y)=I_1(x',y')+P_1(x'',y'')+e_b(x,y)*(I_1(x',y')+P_1(x'',y''))/(I(x',y')+P(x'',y'')).$$

12. The method of claim 8, in which the auxiliary decoding data comprises two sets of decoded motion vectors for each B-Frame associated respectively with the reference I-Frame and the reference P-Frame, and computing the tone-mapped B-frame comprises determining the first predetermined location (x',y') from the set of decoded motion vectors associated with the reference I-Frame and the second predetermined location (x'',y'') from the set of motion vectors associated with the reference P-Frame.

13. The method of claim 12, in which the sets of motion vectors are produced from the MPEG video data stream, and the decoding comprises applying a motion compensation function to decode the sets of motion vectors.

14. The method of claim 1, in which decoding comprises applying a variable length decoding function to the HDR video data to provide a sequence of quantized coefficient sets, applying an inverse scan function upon the coefficient sets to provide an inverse scanned video data signal, applying an inverse quantisation function to the inverse scanned video signal, and applying an Inverse Discrete Cosine Transform on the inverse quantized video data signal to provide an inverse quantized video data signal.

15. The method of claim 1, the method further comprising performing a colour space transformation of each tone-mapped I-frame, P-frame, and B-frame obtained, and displaying the transformed frames on a displaying device.

16. The method of claim 15, in which the colour space transformation is performed into the RGB colour space.

17. A computer program product for tone-mapping a High Dynamic Range (HDR) data video stream encoded in MPEG format, the computer program product comprising:
   a non-transitory computer readable storage medium having computer usable program code embodied therewith, the computer usable program code comprising:
   computer usable program code to decode the HDR data video stream to generate decoded I-frames, auxiliary decoded data related to P-Frames, and auxiliary decoded data related to B-Frames;
   computer usable program code to apply a tone mapping function to each decoded I-Frame to provide a tone-mapped I-Frame according to a tone mapping operator;
   computer usable program code to, for each P-frame depending on a reference I-frame, compute the tone-mapped P-frame from the tone-mapped I-Frame previously determined for the reference I-frame, the reference I-Frame, and the auxiliary decoding data related to the P-Frame, in which the tone-mapped value for the P-frame $P_1$ (x,y) at a given pixel location (x,y) is determined according to the following equation:

$$P_1(x,y)=I_1(x',y')+e_p(x,y)*I_1(x',y')/I(x',y'); \text{ and}$$

computer usable program code to, for each B-frame, compute the tone-mapped B-frame from the tone mapped I-frame previously determined for the reference I-frame, the tone mapped P-frame previously determined for the reference P-frame, and the auxiliary decoding data related to the B-Frame, in which the tone-mapped value for the B-frame $B_1$ (x,y) at a given pixel location (x,y) is determined according to the following equation:

$$B_1(x,y)=I_1(x',y')+P_1(x'',y'')+e_b(x,y)*(I_1(x',y')+P_1(x'',y''))/(I(x',y')+P(x'',y'')).$$

18. The computer program product of claim 17, in which the computer usable program code to compute the tone-mapped P-frame further comprises:
   computer usable program code to compute the tone-mapped value for the P-frame at a given pixel location (x,y) of the P-Frame from the value $I_1$ (x',y') of the tone-mapped I-Frame at a predetermined pixel location (x',y') at the reference I-Frame corresponding to the pixel location (x, y), the value I(x',y') of the reference I frame at the predetermined location (x',y'), and the auxiliary decoding data related to the P-Frame.

19. The computer program product of claim 17, in which the computer usable program code to compute the tone-mapped B-frame further comprises:
   computer usable program code to compute the tone-mapped value for the B-frame $B_1$ (x,y) at a given pixel location (x,y) of the B-Frame from the value $I_1$ (x',y') of the tone mapped I frame at a first predetermined pixel location (x',y') of the reference I-Frame corresponding to the pixel location (x,y), the value $P_1$ (x'',y'') of the tone mapped P-frame at a second predetermined pixel location (x",y") of the reference P-Frame corresponding to the pixel location (x,y), the value I(x',y') of the reference I frame at the first predetermined location (x',y'), and the auxiliary decoding data related to the B-Frame.

20. The computer program product of claim 17, in which computer usable program code to decode the HDR data video stream further comprises:
computer usable program code to apply a variable length decoding function to the HDR video data to provide a sequence of quantized coefficient sets, applying an inverse scan function upon the coefficient sets to provide an inverse scanned video data signal, applying an inverse quantisation function to the inverse scanned video signal, and applying an Inverse Discrete Cosine Transform on the inverse quantized video data signal to provide an inverse quantized video data signal.

21. The computer program product of claim 17, further comprising:
computer usable program code to perform a colour space transformation of each tone-mapped I-frame, P-frame, and B-frame obtained, and displaying the transformed frames on a displaying device.

22. A system for tone-mapping a High Dynamic Range (HDR) data video stream encoded in MPEG format comprising:
a processor to:
decode the data video HDR data stream to generate decoded I-frames;
from the decoded I-frames, reconstruct P-frames and B-frames;
generate auxiliary decoded data related to P-Frames, and auxiliary decoded data related to B-Frames where the auxiliary decoded data includes an error signal representing an error value at a pixel location;
apply a tone mapping function to each decoded I-Frame to provide a tone-mapped I-Frame according to a tone mapping operator;
for each P-frame depending on a reference I-frame, differentially compute the tone-mapped P-frame values from the tone-mapped I-Frame previously determined for the reference I-frame, the reference I-Frame, and the auxiliary decoding data related to the P-Frame; and
for each B-frame, differentially compute the tone-mapped B-frame values from the tone mapped I-frame previously determined for the reference I-frame, the tone mapped P-frame values previously computed for the reference P-frame, and the auxiliary decoding data related to the B-Frame.

23. The system of claim 22, in which the processor further computes the tone-mapped value for the P-frame at a given pixel location (x,y) of the P-Frame from the value $I_1$ (x',y') of the tone-mapped I-Frame at a predetermined pixel location (x',y') at the reference I-Frame corresponding to the pixel location (x, y), the value I(x',y') of the reference I frame at the predetermined location (x',y'), and the auxiliary decoding data related to the P-Frame.

24. The system of claim 22, in which the processor further computes the tone-mapped value for the B-frame $B_1$ (x,y) at a given pixel location (x,y) of the B-Frame from the value $I_1$ (x',y') of the tone mapped I frame at a first predetermined pixel location (x',y') of the reference I-Frame corresponding to the pixel location (x,y), the value $P_1$ (x",y") of the tone mapped P-frame at a second predetermined pixel location (x",y") of the reference P-Frame corresponding to the pixel location (x,y), the value I(x',y') of the reference I frame at the first predetermined location (x',y'), and the auxiliary decoding data related to the B-Frame.

25. The system of claim 22, in which decoding the HDR data video stream further comprises applying a variable length decoding function to the HDR video data to provide a sequence of quantized coefficient sets, applying an inverse scan function upon the coefficient sets to provide an inverse scanned video data signal, applying an inverse quantisation function to the inverse scanned video signal, and applying an Inverse Discrete Cosine Transform on the inverse quantized video data signal to provide an inverse quantized video data signal.

* * * * *